United States Patent [19]

Ootsuka

[11] Patent Number: 4,787,037
[45] Date of Patent: Nov. 22, 1988

[54] ECR WITH DATA MEMORY STRUCTURE FOR TRANSMITTING SALES DATA AND RE-STOCK DATA TO AN EXTERNAL UNIT

[75] Inventor: Tetsuo Ootsuka, Tokyo, Japan

[73] Assignee: Casio Computer Co., Ltd., Tokyo, Japan

[21] Appl. No.: 433,864

[22] Filed: Oct. 13, 1982

[30] Foreign Application Priority Data

Oct. 19, 1981 [JP] Japan .................. 56-167417

[51] Int. Cl.[4] ...................... G07G 1/12; G06F 15/21
[52] U.S. Cl. .................... 364/404; 364/405
[58] Field of Search .............. 364/405, 404, 900

[56] References Cited

U.S. PATENT DOCUMENTS

| | | | |
|---|---|---|---|
| 3,330,947 | 7/1967 | Alpert et al. | 364/405 |
| 3,748,452 | 7/1973 | Ruben | 364/405 |
| 3,909,604 | 9/1975 | Monna | 364/900 X |
| 3,991,495 | 11/1976 | Wilson | 40/375 |
| 4,028,537 | 6/1977 | Snow | 235/383 |
| 4,107,784 | 8/1978 | Van Bemmelen | 364/900 |
| 4,293,911 | 10/1981 | Oonishi | 364/405 |

FOREIGN PATENT DOCUMENTS

| | | | |
|---|---|---|---|
| 0080937 | 7/1978 | Japan | 364/405 |
| 0054556 | 4/1979 | Japan | 364/405 |
| 0157061 | 6/1980 | Japan | 364/405 |
| 0103672 | 8/1980 | Japan | 364/405 |
| 1405055 | 9/1975 | United Kingdom | 364/404 |
| 1594240 | 7/1981 | United Kingdom | |

OTHER PUBLICATIONS

Post System With Clerical Facilities/Functions; IBM Disclosure, Allmendinger et al., 1/76.

Primary Examiner—Jerry Smith
Assistant Examiner—Clark A. Jablon
Attorney, Agent, or Firm—Frishauf, Holtz, Goodman & Woodward

[57] ABSTRACT

An electrical cash register is disclosed, which is provided with a numerical data memory in which sales data input from a keyboard are successively accumulated, and also in which commodity data for different items input from said keyboard are stored when a particular key on the keyboard is operated. When a data transmission key on the keyboard is operated, the sum of sales data and commodity data stored in the numerical data memory are transmitted to an external apparatus. Before commodity data is transmitted, its format requirement (digit number length) is checked and commodity data memory availability for the particular requirement is also checked.

5 Claims, 5 Drawing Sheets

ECR WITH DATA MEMORY STRUCTURE FOR TRANSMITTING SALES DATA AND RE-STOCK DATA TO AN EXTERNAL UNIT

BACKGROUND OF THE INVENTION

This invention relates to an electronic cash register having a function of transmitting total data stored in it to a data collection system connected to it through a transmission line.

Generally, an electronic cash register having the function of transmission as above is provided with a total memory, in which classified sales data input from a keyboard are accumulated for the individual classes in a plurality of memory areas. The data collection system to which the electronic cash register is connected through a transmission line, is provided with a memory having memory areas in a one-to-one correspondence relation to the memory areas of the electronic cash register. At the time of the data transfer, the data stored in the total memory of the electronic cash register is transferred to the data collection system and accumulated in a corresponding memory area in the data collection system.

In the prior art electronic cash register, the data that can be written into the individual memory areas of the total memory are limited to the sales data input for the individual classes from the keyboard or the accumulated sales total data, that is, only the sales data or sales total data can be transmitted from the electronic cash register to the data collection system through the transmission line.

Therefore, in a system where an electronic cash register that is installed in a shop and a data collection system installed in a main office, if the shop gets out of a commodity dealt by it, it is necessary for the shop to order the lacking commodity to the main office by using a separate machine and specifying the identification and quantity of the commodity. Hitherto, this contact has been done using a communication machine such as a facsimile set or a telephone set. In such a case, both the shop and main office should be provided with respective communication machines. That is, corresponding equipment cost is necessary, and also a constant space must be occupied by the machine. It may be thought to make contact by mail. In this case, although the aforementioned machine is not required, the speed of contact is very slow, so that smooth transmission of information sometimes may not be obtained.

SUMMARY OF THE INVENTION

The invention has been intended in light of the above situation, and its object is to provide an electronic cash register, in which commodity data other than the sales total data can be written into a memory with a keying operation and can be transmitted to a data collection system.

To attain the above object, according to the invention there is provided an electronic cash register, which comprises a keyboard provided with a plurality of keys including numeral keys, a data input key and a data transmission key, a central processing unit connected to the keyboard and including input data storage means for storing numerical data input with operation of numeral keys on the keyboard and a digit number memory or format memory for storing digit numbers of commodity data consisting of numerical data of a plurality of digits for different commodity data items, a numerical data memory connected to the central processing unit and including a first memory for storing the totals of sales data input from the keyboard and a second memory for storing commodity data for a plurality of items input from the keyboard, and a transmission control section connected to the central processing unit and including a mechanism for transmitting data coupled from the central processing unit to an external unit, the central processing unit functioning such that when a data write key on the keyboard is operated after data of numerical values corresponding to commodity data have been stored in the input data storage means, it reads out the digit numbers of items corresponding to commodity data from the digit number memory, format checks the commodity for the data for format requirements, checks the second memory in the numerical data memory to assure the availability of adquate memory areas therein and writes the numerical data stored in the input data storage means into the memory areas, and when the transmission key on the keyboard is operated, it transmits the commodity data for different items stored in the second memory together with total sales data stored in the first memory.

With the above construction of the electronic cash register according to the invention, data about the stock and stock renewal on the shop side can be written into the memory and transmitted to the data collection system. Thus, the electronic cash register can serve both as a machine for managing the total sales data and as a machine for ordering commodities, so that it is unnecessary to provide any separate communication machine for ordering and it is possible to save space in the shop as well as being economical.

BRIEF DESCRIPTION OF THE DRAWINGS

FIG. 4 is a flow chart to explain the operation when an SK key is operated.

DETAILED DESCRIPTION OF THE PREFERRED EMBODIMENTS

Figure 1:
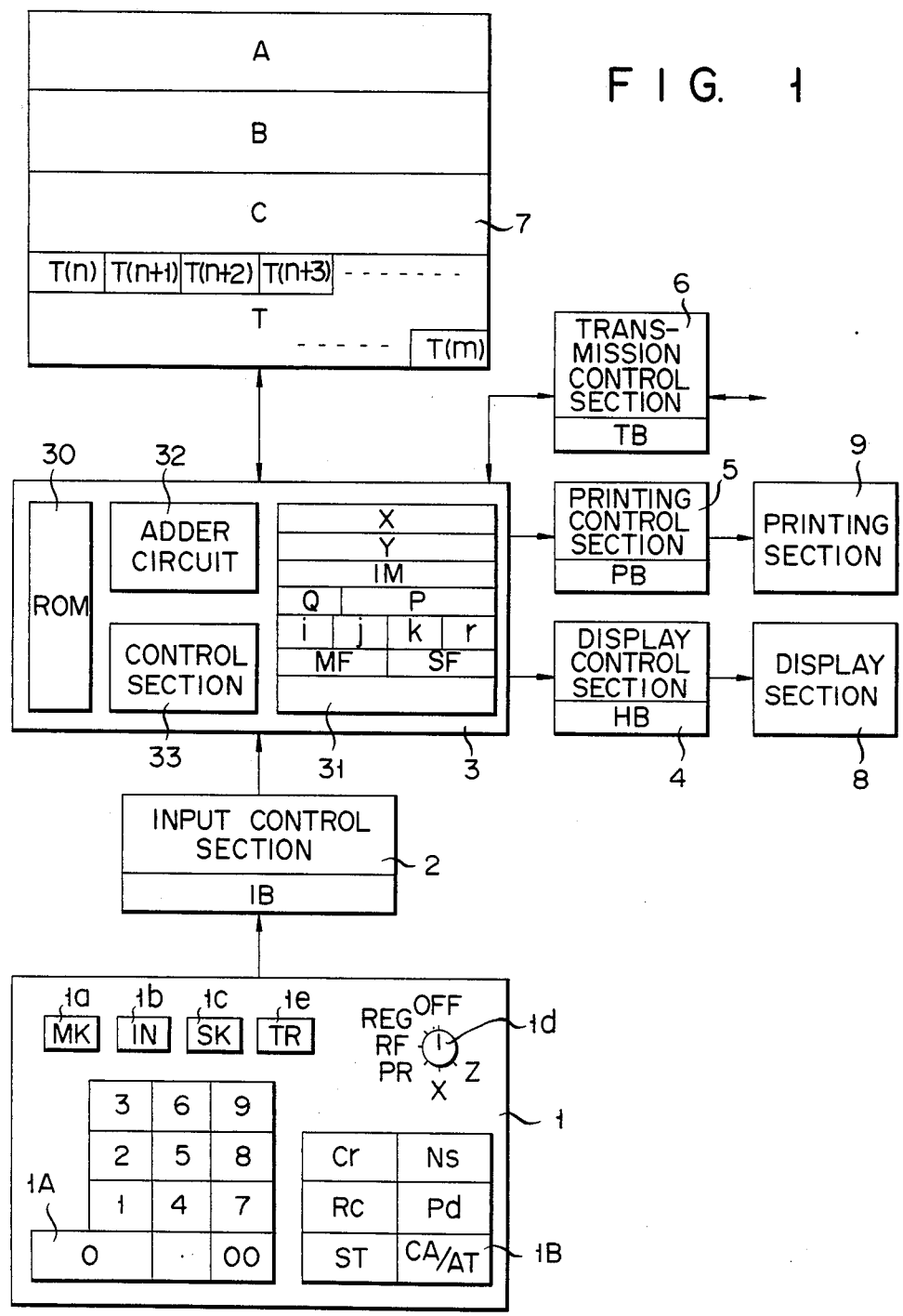
FIG. 1 is a schematic drawing representing an embodiment of the electronic cash register according to the invention.

Now, an embodiment of the invention will be described with reference to the drawings. FIG. 1 is a schematic showing an electronic cash register according to the invention. The electronic cash register includes a keyboard 1, which has numeral keys 1A, various function keys 1B such as a department key and a cash/deposit key, an MK (mode setting) key 1a, an IN (input) key 1b, an SK (correction) key 1c and a TR (transmission) key 1e. The keyboard 1 is further provided with a mode switch 1d which can specify various modes such as a "PR" (preset operation) mode, a "REG" (registering operation) mode and an "X" (read operation) mode. A signal from the keyboard 1 is coupled through a buffer register IB in an input control section 2 to a central processing unit (CPU) 3. The CPU 3 controls the entire system, and it includes a ROM (read only memory) 30 in which various microcommands are stored, a RAM (random access memory) 31 having an X register as input data storage means, a P register as format memory and Y, IM, Q, i, j, k, r, MF, SF registers as calculation memory, an adder circuit 32 for effecting addition and subtraction of data, and a control section 33 for providing various control signals. The CPU 3 transmits display data to a buffer register HB of a display control section 4, printing data to a buffer register PB in a printing control section 5 and transmission data to a buffer register TB in a transmission control section 6. Further, the CPU 3 exchanges data with a memory 7. The display control section 4 converts display data supplied to its buffer register HB into display drive signals supplied to the display section 8 for display. The printing control section 5 converts printing data supplied to its buffer register PB into printing drive signals supplied to the printing section 9 for printing. The transmission control section 6 transmits transmission data supplied to its buffer register TB to a data collection system (not shown). Also, it transmits transmission data supplied from the data collection system through the buffer register TB to the CPU 3.

The memory 7 includes a department sales data memory A for storing sales data for different departments, a transaction sales data memory B for storing sales data for different transactions such as cash sale, deposit sale, credit sale, etc., and a person-in-charge sales data memory C for storing sales data for different persons in charge. The memory 7 further includes an additional data memory T, into which commodity data can be directly written in accordance with a key operation in the keyboard 1 as will be explained after certain other operations are described.

Figure 2:
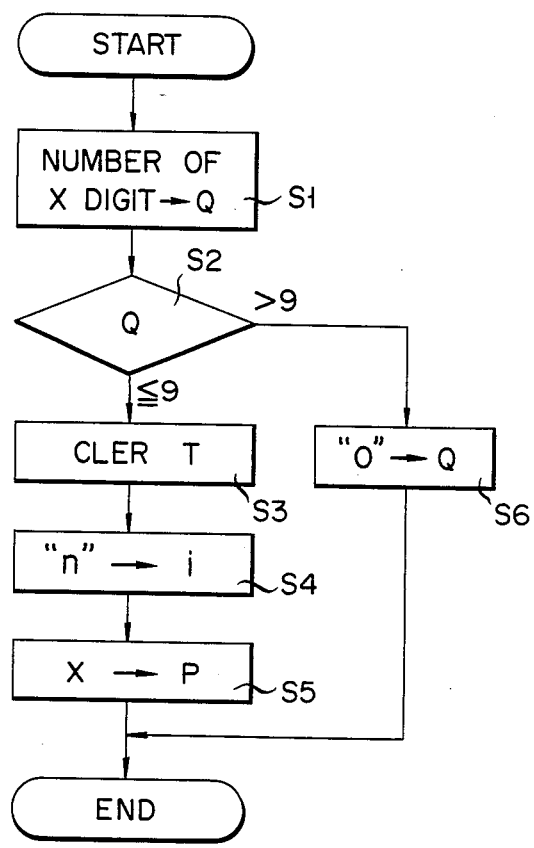
FIG. 2 is a flow chart for explaining the operation of one embodiment of the electronic cash register according to the invention in a case where an IN key is operated in a preset mode.

Now, the operation of the embodiment of the above construction will be described. Before the first writing of commodity data into the additional data memory T in the memory 7, it is necessary that a format for the content of the memory T shall have been specified. To do that, the mode switch 1d is set to the PR mode, and then digit numbers of commodity data consisting of a plurality of items are input for individual items. For example, a case where writing manufacturer code data as 4-digit data, commodity number code data as 5-digit data and quantity code data as 6-digit data for commodity data consisting of three items into the additonal data memory T will be assumed. In this case, numerals "4", "5" and "6" corresponding to the maximum digit numbers for the respective items are input by successively operating the corresponding numeral keys. As a result, the numerical data "4", "5" and "6" are written through the buffer register IB in the input control section 2 into the X register in the CPU 3. Then, the IN key 1b is opeated. As a result, an operation as shown in the flow chart of FIG. 2 is executed. The X register is the input data storage register.

In a step S2, X data stored in the X register, i.e., the digit numbers of the numerical data stored in the X register, are transferred to the Q register in the CPU 3. Then a step S2 is executed, in which a decision as to whether the digit number data stored in the Q register has exceeded "9", which is the maximum digit number, is executed. If it is determined that the digit number data is no greater than "9", the individual digit number data that have been input are made effective, and a step S3 is executed. In the step S3, the contents of the additional data memory T are cleared. Then a step S4 is executed, in which address data "n" specifying the first memory area in the additional data memory T is written into the i register in the CPU 3. Then a step S5 is executed, in which the digit number data in the X register are transferred in the reverse order to the P register in the CPU 3. If it is determined in step S2 that the digit number data in the Q register is greater than "9", step S6 is executed, in which "0" is written in the Q register so that the input digit number data is made ineffective.

When the numeral keys for the numerals "4", "5" and "6" and the IN key 1b are successively operated in the mentioned order, the steps S1 through S6 are successively executed. Thus, "3" is stored in the Q register, and "645" is stored in the P register which operates as a format memory.

After the digit numbers for the individual items have been input in the manner as described, the mode switch 1d is set to the "REG" mode for causing the registering operation. The input sales data are thus accumulated in the corresponding memory areas of the department sales data memory A and person-in-charge sales data memory C in the memory 7. When a function key such as the cash/deposit key is operated after the completion of the registering for one customer, the subtotal of the input sales data is added to the cash sales data total in the transcation sales data memory B in the memory 7. Further, a receipt on which the input individual data are printed is issued from the printing section 9.

Figure 3:
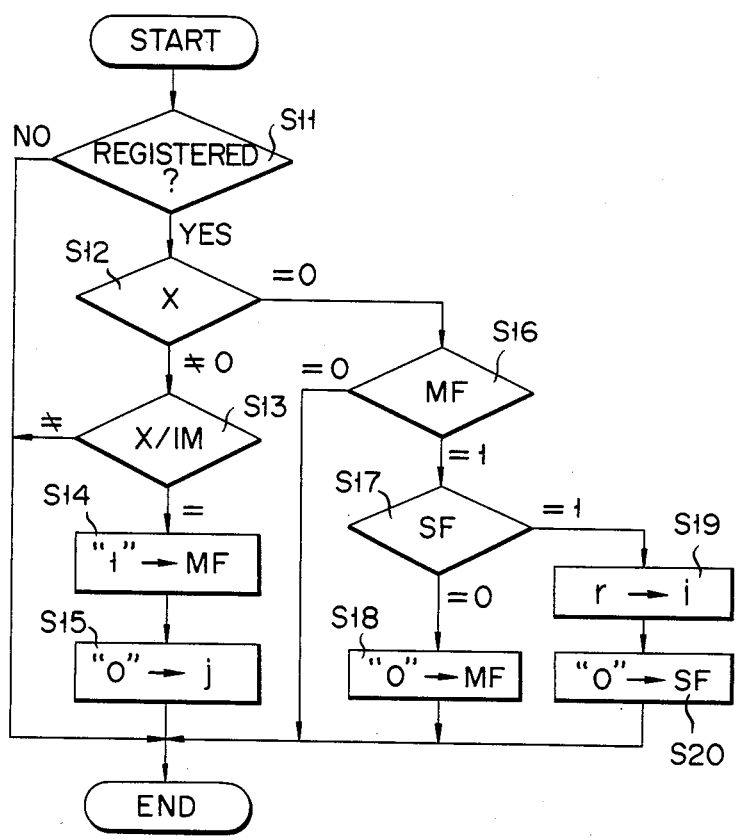
FIG. 3 is a flow chart for explaining the operation in a case where an MK key is operated.

Now it is assumed that a shop gets out of some commodity stock and manufacturer code data, commodity code data and quantity code data are to be written into the additional data memory T for ordering the pertinent commodity. In this case, after a receipt has been issued upon completion of the registration for one customer, a preset input mode number is input into the IM register in the CPU 3, and then the MK key 1a is operated. As a result, an operation as shown in the flow chart of FIG. 3 is executed.

In a step S11, a decision as to whether the MK key 1a has been operated after the completion of the registering is made. If it is determined that the registration has not yet been completed, the operation of the MK key is made ineffective. If it is determined that the registration has been completed, step S12 is executed. In step S12, a decision as to whether the contents of the X register are "0" is made. If it is determined that the contents are not "0", it is then determined that numeral keys have been operated, and step S13 is executed. In step S13 a decision as to whether the numerical data in the X register coincides with the input mode data set in the IM register in the CPU 3 is made. If it is determined that the two do not coincide, the operation of the MK key is made ineffective. If it is determined that the two coincide, step S14 is executed, in which a flag data "1" indicating the setting of the input mode is written into the MF register in the CPU 3. Then, step S15 is executed, in which "0" is written into the j register in the CPU 3. In the above way, the input mode setting operation is executed in steps S13 through S15.

If it is determined in the step S12 that the content of the X register is "0", it is determined that the input mode number has not been input, and a step S16 is executed. In the step S16, a decision as to whether the input mode setting flag "1" has been stored in the MF register is made. If it is determined that the flag data has not been stored, the operation of the MK key 1a is made ineffective. If it is determined that the flag data has been stored, step S17 is executed, in which a decision as to whether a flag data "1" indicating that contents of the additional data memory T are being corrected is stored in the SF register in the CPU 3 is made. If it is determined that the flag data has not been stored, step S18 is executed. In step S18, "0" is written into the MF register, and the input mode setting state is released to recover the normal "REG" mode. If it is determined in step S17 that the correction flag data "1" is stored in the SF register, a step S19 is executed. In this step, an address data having been stored in the r register in the CPU 3 is transferred to the i register for correcting the contents of the additional data memory T. Then, a step S20 is executed to write "0" into the SF register and then release the correction state to recover the data write state in the input mode.

Figure 4:
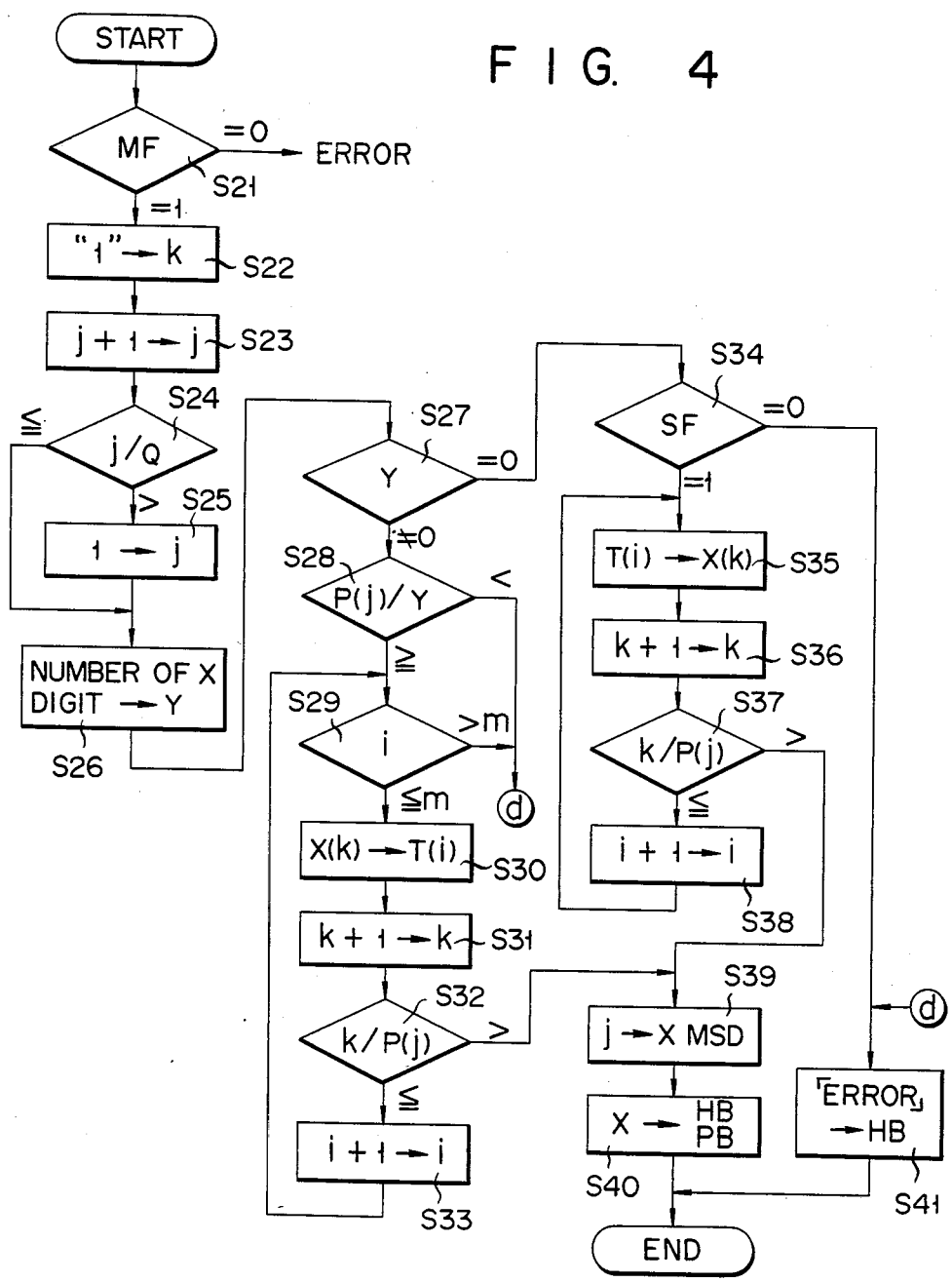
FIG. 4 is a flow chart for explaining the operation when the IN is operated in an input mode.

As has been shown, when the MK key 1a is operated after inputting the input mode number, the input mode setting flag data "1" is stored in the MF register, and the electronic cash register is subsequently set in the input mode. Thereafter, the numeral keys "1", "2", "2" and "2", IN key 1b, numeral keys "2", "4", "3", "3" and "1", IN key 1b, numeral keys "8" and "0" and IN key 1b are successively operated to successively input the corresponding manufacturer code data, commodity code data and quantity code data. At this time, each time the IN key 1b is operated, an operation as shown in the flow chart of FIG. 4 is executed in order to check format requirements and memory availability and then write into the memory T. In step 21, a decision as to whether the input mode setting flag data "1" has been stored in the MF register is made. If it is determined that the flag data has not been stored, the operation of the IN key is treated as an error. In a subsequent step S22, an initial value "1" is set in the k register in the CPU 3. Then, in step S23 "1" is added to the content of the j register, into which "0" has been written in step 15 at the time of the input mode setting. Then, step S24 is executed, in which a decision as to whether the contents of the j register is less than the time digit number data stored in the Q register in the CPU 3 is made. If it is determined that the former is not less than the latter, a step S25 is executed. In the step S25, "1" specifying the lowest place digit in the P register is written into the P register, and step S26 is executed. If it is determined in step S24 that the contents of the j register are less than the item digit number data in the Q register, step S26 is executed. In step S26, the digit number of the numerical data stored in the X register is transferred to the Y register in the CPU 3. Then, step S27 is executed, in which a decision as to whether the contents of the Y register are "0" is made. If it is determined that the contents are not "0", it is determined that numeral key operation has been done immediately before the operation of the IN key 1b, and a step S28 is executed. In step S28 a decision as to whether the digit number data stored in the digit P(j) area of the P register as specified by the contents of the j register are greater than the digit number data of the numerical data of the Y register input this time is made. If it is determined that the former is not greater than the latter, step S29 is executed. Now that it is established that the commodity data complies with the format requirements, the next operations are to assure that there is available space in the additional memory T and to write the data in the memory T. In step S29 a decision as to whether the address data in the i register is less than the last address "m" in the additonal data memor T is made. If it is determined that the former is greater than the latter, step S30 is executed, in which numerical data stored in a digit X(k) are of the X register specified by the contents of the K register are transferred to a memory area T(i) of the additional data memory T specified by the address data of the i register. Then, a step S31 is executed, in which the contents of the k register are incremented by "+1". Then, step S32 is executed, in which a decision as to whether the contents of the k register are less than the digit number data in the digit P(j) area in the P register specified by the contents of the j register are made. If it is determined that the former is less than the latter, "1" is added to the address data in the i register. Then, the operation is returned to step S29. The steps S29 through S33 are repeatedly executed, whereby the numerical data stored in the X register are successively written into memory areas of the additonal data memory T.

If it is determined in step S27 that the contents of the Y register are "0", that is, no numeral key has been operated immediately before the operation of the IN key 1b, step S34 is executed. In step S34, a decision as to whether a correction flag data "1" has been stored in the SF register of the CPU 3 is made. If it is determined that the flag data has been stored, step S35 is executed. In step S35, numerical data stored in the memory area T(i) specified by the address data of the i register is transferred to the digit X(k) area of the X register specified by the k register. Then, step S36 is executed, in which the contents of the k register are incremented by "+1". Then, step S37 is executed, in which a decision as to whether the contents of the k register are less than the digit number data stored in the digit P(j) area of the P register specified by the j register. If it is determined that the former is less than the latter, step S38 is executed. In step S38, "1" is subtracted from the address data of the i register, and the operation is then returned to step S35. The steps S35 through S38 are repeatedly executed, whereby the numerical data for a predetermined digit number stored in a predetermined memory area of the additional data memory T are transferred to the X register.

If it is determined in step S32 or step S37 that the contents of the k register are greater than the digit number data in the digit P(j) area, that is, if it is determined that the reading of a series of data for the corresponding correction has been completed or if it is determined that the writing of the data of the X register into the additional data memory T has been completed, step S39 is executed. In step S39, item digit number data stored in the j register is transferred to the highest place digit $X_{MSD}$ area of the X register. Then, step S40 is executed in which the contents of the X register are transferred to the buffer register HB of the display control section and also to the buffer register PB of the printing control section 5, so that it is displayed in the display section 8 and is also printed on a recording sheet in the printing section 9.

If it is determined in step S28 that the digit number data stored in the digit P(j) area is less than the digit number data of the numerical data of the Y register input this time, or if it is determined in step S29 that the address data of the i register is greater than the last address "m" of the input memory T, or if it is determined in step S34 that the correction flag data "1" has not been stored in the SF register, step S41 is executed. In step S41, a "ERROR" data indicating that the operation of the IN key 1b has been made ineffective, is transferred to the buffer register HB in the display control section 4 to display "ERROR" in the display section 8.

As has been shown, when the manufacturer code data "1222" is input after operating the IN key 1b, steps S21 through S31 are successively executed, and then steps S32, S33 and S29 through S31 are successively executed three times. Thus, the manufacturer code data "1222" is successively written into the memory areas T(n) to T(n+3) of the additional data memory T. Thereafter, steps S39 and S40 are successively executed. Thus, the manufacturer code data "1222" having been input as "1" representing the first one of three items, is displayed in display section 8, and also the same data is printed. When subsequent commodity number code data and quantity code data are input in response to the operation of the In key 1b, the same operation as described before is executed. Thus, commodity number code data "243331" is written into memory areas T(n+4) to T(n+9) of the additional data memory T, and also quantity code data "00080" is written into memory areas T(n+10) to T(n+14). The same data are also displayed together with the data "2" and "3" representing the order of items in display section 8.

Figure 5:
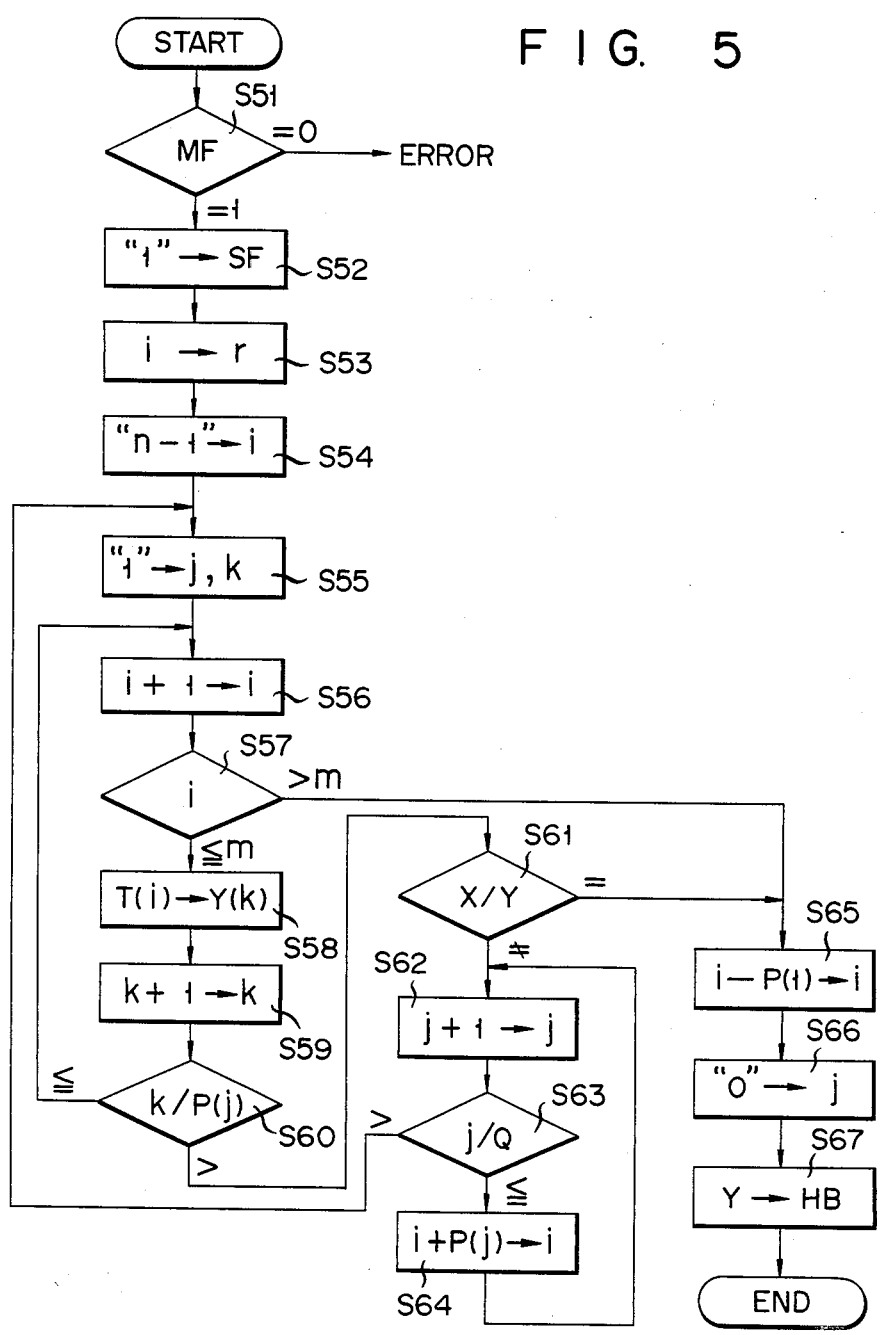

In the case where some of the data for the individual items input in the manner as described before contain an error, a correcting operation is executed as will now be described. If the input commodity code data contains an error, the corresponding manufacturer code data "1222" is keyed in, and then the SK key 1c is operated. As a result, an operation as shown in the flow chart of FIG. 5 is executed.

In a step S51, a decision as to whether input mode flag data "1" has been stored in the MF register is made. If it is determined that the flag data has not been stored, the operation of the SK key 1c is made ineffective. If it is determined that the flag data has been stored, step S52 is executed. In step S52 a correction flag data "1" is written into the SF register. Then, step S53 is executed, in which address data specifying the writing of the next data of the additional data memory T stored in the i register is transferred to the r register of the CPU 3. Then, in a subsequent step S54 address data "n−1" is written in the i register to effect setting of the initial value. Then, step S55 is executed, in which "1" is written in the j and k registers. Then, step S56 is executed, in which the address data of the i register is incremented by "+1". Then, in step 57 a decision as to whether the address data of the i register is less than the last address "m" of the additional data memory T is made. If it is determined that the former is less than the latter, step S58 is executed. In step S53, the numerical data stored in the memory area T(i) of the additional data memory T specified by the address data of the i register is transferred to the digit Y(k) area of the Y register specified by the contents of the k register. Then step S59 is executed, in which "1" is added to the contents of the k register. Then step S60 is executed, in which a decision as to whether the contents of the k register are less than the digit number data in the digit P(j) area of the P register specified by the i register is made. If it is determined that the former is less than the latter, the operation is returned to step S56. In this way, steps S56 through S60 are successively executed repeatedly a number of times corresponding to the digit number stored in the digit P(i) area. As a result, the numerical data read out from the additional data memory T is written into the Y register. If it is determined in step S60 that the contents of the k register have exceeded the digit number data in the digit P(j), step S61 is executed. In step S61 a decision as to whether the numerical data stored in the X register is equal to the numerical data in the Y register is made. If it is determined that the two are not equal, it is determined that data necessary for effecting a correction has not yet been read out, and step S62 is executed. In step S62, "1" is added to the contents of the j register. Then, step S63 is executed, in which a decision as to whether the contents of the j register is less than the item digit number data in the Q register is made. If it is determined that the former is less than the latter, step S64 is executed. In step S64, the address data in the i register is renewed by adding digit number data stored in the digit P(j) area specified by the contents of the j register to the old data. Then, the operation is returned to step S62. If the data transferred to the Y register coincides with the data in the X register, steps S62 through S64 are repeatedly executed. Whenever this is done, the address data in the i register is renewed by the digit number data in the digit P(J) area. If it is determined in step S63 that the contents of the j register are greater than the item digit number data in the Q register, the address renewal of the i register in step S64 is ended, and the operation is returned to step S55 to read out the data of the additional data memory T afresh.

If it is determined in step S57 that the address data in the i register has exceeded the last address "m" in additional data memory T, or if it is determined in step S61 that the contents in the X register coincide with the contents in the Y register, the reading of data from additional data memory T is ended, and step S65 is executed. In step S65, the digit number data in the digit P(l) area is subtracted from the address data in the i register specifying the last address of data in the Y register read out from additional data memory T, and the result is written as the address data specifying the first address of data read out as mentioned above into the i register. Then, step S66 is executed, in which "0" is written into the j register. Then, in step S67, the data stored in the Y register is transferred to the buffer register HB of the display control section 4 and displayed in display section 8.

When the manufacturer code data "1222" is input by operating the SK key 1c for correcting data in input memory T, steps S51 through S59 are executed, and then steps S60 and S56 through S59 are successively executed three times. Thus, the manufacturer code data stored in memory area T(n) to T(n+3) in the additional data memory T are displayed. When the IN key 1b is subsequently operated, step S21 through S27 and S34 through S37 are successively executed, and then steps S38, S35 through S37, S39 and S40 are executed. Thus, the quantity code data "80" stored in memory areas T(n+10) to T(n+14) are displayed together with the data "3" indicating the third item. When the MK key 1a is operated after the correcting operation has been completed, steps S11, S12, S16, S17, S19 and S20 are successively executed. As a result, address data of the i register that has been transferred to the r register at the time of the start of the correcting operation is transferred again to the i register, and subsequently the electronic cash register is set to the data writing state in the input mode.

If it is desired to release the input mode state, the MK key 1a is operated. As a result, steps S11, S12 and S16 through S18 are successively executed, whereby "0" is written into the MK register, and subsequently the registering operation in the "REG" mode is executed.

When the TR key 1e on the keyboard 1 is operated after the mode switch 1d has been set to the X mode following the writing of data into the memory 7, the sales total data in the memories A, B and C and the data in the additional data memory T are transmitted through the transmission control section 6 to an external or central unit as the data collection system. Also, these data are transferred to the buffer register PB in the printing control section 5 and printed on a recording sheet in the printing section 9.

What is claimed is:

1. An electronic cash register for transmitting sales data and commodity re-stock data to an external unit, comprising:

a keyborad (1) having a plurality of keys including numeral keys (1a), a data write key (1b) and a transmission key (1e);

a central processing unit (3) coupled to said keyboard and including input data storage means (X) for storing input data, which is input by operation of numeral keys on said keyboard, and format data memory means (P) for storing the number of digits of each of a plurality of data items required for transmission of said commodity data;

sales data memory means (A, B, C) coupled to said central processing unit for storing various accumulated totals of sales data input from said keyboard;

additional data memory means (T), coupled to said central processing unit for storing, in format ready for transmission, commodity data items in numerical or numerically coded form obtained from said input data storage means; and transmission control means (6) coupled to said central processing unit and to said sales data and additional data memory means and including means for transmitting data from said central processing unit to said external unit;

said central processing unit including:

means for reading out the digit number data of each item of said commodity data from said format data memory means (P);

means for checking each commodity data item in said input data storage means with said digit number data for format requirements and for checking said additional data memory means to assure the presence of available memory areas therein having a size corresponding to said digit number data;

means for writing into said available memory areas a commodity data item stored in said input data storage means after said commodity data item is successfully checked by said data and memory checking means;

means responsive to operation of said data key on said keyboard after a commodity data item has been stored in said input data storage means for activating, in turn, said digit number data read-out means, said data and memory checking means and said data writing means, and means responsive to operation of said transmission key on said keyboard for causing said transmission control means to transmit to said external unit the commodity data composed of items in accordance with said format data memory means and written into said memory areas of said additional data memory means.

2. The electronic cash register of claim 1, wherein said keyboard further comprises a correction key, and said central processing unit is responsive to operation of said correction key after one item data of said commodity data has been input, for searching for memory areas in which said input one item data is stored and for subsequently writing corrected item data into said memory areas.

3. The electronic cash register of claim 1, wherein said sales data memory means comprises a department sales data memory area, a transaction sales data memory area and a person-in-charge sales data memory area and wherein said means responsive to operation of said transmission key for causing said transmission control means to transmit commodity data to said external unit serves to cause transmission to said external unit of both sales data stored in said sales data memory means and commodity data stored in said additional memory means.

4. The electronic cash register according to claim 3, which further comprises a printer coupled to said central processing unit, data transmitted from said central processing unit to said printer being printed on a recording sheet in said printer.

5. The electronic register of claim 4, wherein said central processing unit further includes means responsive to operation of said transmission key on said keyboard for causing transmitting of data of the total of sales data stored in said sales data memory means to said printer for printing thereof on said recording paper.

* * * * *